United States Patent [19]
Safta et al.

[11] Patent Number: 5,994,424
[45] Date of Patent: Nov. 30, 1999

[54] UV CURABLE POLISH AND METHOD OF USE

[75] Inventors: Eugen Safta, Winston-Salem; Frank Chen; Greg Muselman, both of Greensboro; James V. Mirante, Archdale; Danny R. Linthicum, Lexington, all of N.C.

[73] Assignee: Lilly Industries, Inc., Indianapolis, Ind.

[21] Appl. No.: 09/022,938

[22] Filed: Feb. 12, 1998

Related U.S. Application Data

[63] Continuation-in-part of application No. 08/838,569, Apr. 10, 1997, Pat. No. 5,837,745.

[51] Int. Cl.$^6$ .................... C08J 7/18; C08J 3/07; C08J 3/28; C08L 83/04
[52] U.S. Cl. .................... 522/8; 522/10; 522/12; 522/14; 522/79; 522/80; 522/84; 522/85; 524/501; 524/804; 524/831; 524/837; 427/499; 427/501; 427/503; 427/512; 427/513; 427/515
[58] Field of Search .................... 522/8, 10, 12, 522/14, 79, 80, 84, 86, 85; 524/501, 804, 831, 837; 427/499, 503, 512, 515, 501, 513

[56] References Cited

U.S. PATENT DOCUMENTS

| Re. 28,914 | 7/1976 | Marco | 522/116 |
|---|---|---|---|
| 3,749,592 | 7/1973 | Gaske et al. | 117/62 |
| 4,016,333 | 4/1977 | Gaske et al. | 522/172 |
| 4,147,603 | 4/1979 | Pacifici et al. | 204/159.12 |
| 4,233,425 | 11/1980 | Tefertiller et al. | 525/455 |
| 4,272,420 | 6/1981 | Frank et al. | 52/86 |
| 4,407,855 | 10/1983 | Russell | 427/54.1 |
| 4,451,509 | 5/1984 | Frank et al. | 522/85 |
| 4,565,857 | 1/1986 | Grant | 527/301 |
| 4,605,567 | 8/1986 | Muller et al. | 522/99 |
| 4,656,202 | 4/1987 | Nason et al. | 522/89 |
| 4,683,260 | 7/1987 | Wickert | 524/512 |
| 5,409,971 | 4/1995 | Wolfersberger et al. | 523/201 |
| 5,482,994 | 1/1996 | Liles et al. | 524/789 |

FOREIGN PATENT DOCUMENTS 55-120603   9/1980   Japan .

OTHER PUBLICATIONS

Product Information on Specialty Additives, "Specialty Additives—Dispersing Agents Waxes and Other Additives", Daniel Products Company, Inc., product brochure (date unknown).
"General Information A 6.1—Additives for Aqueous and UB/EB–Curing Wood and Furniture Coatings", BYK–Chemie USA, product brochure (date unknown).
Product Information on "Bayhydrol 850W", Miles, Inc., Industrial Chemicals Division, Nov., 1992, product brochure.
"Formulating Ultraviolet Curable Coatings", Eli Levine, *Modern Paint and Coatings*, Aug., 1983, pp. 26–29.
Product Information on "BYK–370, BYK 371, BYK–375", BYKChemie, USA, Oct., 1996, product brochure.
"Ultraflex ZB 2773 UV—Non–Ionic Aliphatic Polyurethane Dispersion", DSM Resins U.S., Inc., product information, (date unknown).
Product Information on "Silicone Additives", Dow Corning, before Feb. 12, 1998, product use guide.
Cure profiles of various latex coatings, Osi Product Information, Osi Specialities, before (date unknown).
"Chemohardening water–thinned varnishes for furniture industry", Zygmunt Hehn and and Dominik Nowak, *Pzem. Chem.*, vol. 66(2), 1987, pp. 94–95.
"Acrylic Emulsions for Radiation Curing", Kurt A. Wood, pp. 360–369 (date unknown).
"Aliphatic Crosslinkers Provide Low–Temperature–Cure coatings", M. Ojunga–Andrew, Monsanto Company, *Modern Paint and Coatings*, Nov., 1990.
Product Information on "Santolink XI 100", Monsanto, product brochure (date unknown).
Product Information on "AP–02–80", Advanced Polymer, Inc., Nov. 15, 1995; product brochure.
Product Information on "KF–28 GEL", Advanced Polymer, Inc., Apr. 22, 1996; product brochure.
Product Information on "RoShield 3120", Rohm and Haas Company Oct., 1995; product brochure.
"UV Cured Coatings For Wood Funiture", Robert S. Bailey, *Radiation Curing*, Nov., 1983, pp. 14–17.

*Primary Examiner*—Susan W. Berman
*Attorney, Agent, or Firm*—Barnes & Thornburg

[57] ABSTRACT

A free-radical curable polish composition is described. The composition can be applied and cured as an ultra thin film on finished surfaces to provide enhanced chemical and mar resistance. The composition comprises an aqueous emulsion including an olefin-functional polymer or an olefin-functional prepolymer, and a silicone or silicone copolymer preferably with photoinitiators for UV and EB cure. The polish/emulsion can be applied, for example, to wet the surface of nitrocellulose lacquer wood finishes. The polish wet surface is first wiped to remove excess polish and thereafter exposed to UV radiation to provide a thin, polymerized protective film.

18 Claims, No Drawings

UV CURABLE POLISH AND METHOD OF USE

CROSS-REFERENCE TO RELATED APPLICATIONS

This application is a continuation-in-part of U.S. application Ser. No. 08/838,569, filed Apr. 10, 1997.

This invention relates to a free-radical curable polish composition. More particularly, this invention is directed to a UV or EB curable polish composition and its use to provide continuous ultra-thin coatings exhibiting enhanced abrasion and chemical resistance to a wide variety of finished surfaces. The composition and method offer particular advantage to wood finishing applications where the polish can be applied and cured on nitrocellulose lacquer and other finishes to enhance abrasion and chemical resistance without compromising the appearance quality of the underlying finish.

BACKGROUND AND SUMMARY OF THE INVENTION

Wood surfaces on furniture and other fine wood products are typically finished with stains, lacquers and other coatings to provide aesthetically pleasing finishes. Furniture finishing of the highest quality traditionally employs finishing protocols using cellulosic lacquers, such as nitrocellulose lacquer. Cellulosic lacquers are relatively inexpensive, easy to apply and repair, and importantly, can be rubbed/buffed to the deep, high quality luster desirable in the fine furniture market. Cellulosic lacquers, however, have several disadvantages, including poor resistance to abrasion and solvent/chemical attack.

Various alternatives to cellulosic lacquers have been developed to improve the durability of wood finishes. Thus cellulosic lacquers have been replaced with thermosetting coatings. Other approaches to obviate the disadvantages of cellulosic lacquers have sought to increase the hardness of cellulosic lacquers by adding cross-linkable functionality to lacquer components and curing the applied finish. These approaches provide wood finishes with greater chemical and abrasion resistance, but do so only with compromise of finish quality and repairability available using traditional cellulosic lacquers.

The present invention provides a novel method for improving the physical characteristics, for example, mar and chemical resistance not only of traditional wood, finishes but other surfaces as well, including, but not limited to, leather, metallic, plastic, textile and painted surfaces. In accordance with one embodiment of this invention, a traditionally finished wood surface is wetted with a free-radical curable polish composition. The surface is wiped free of excess polish leaving an ultra thin, continuous, preferably visibly indiscernible, polish film. The surface is then exposed to free-radical initiating conditions to cure the polish film. The cured, polish-coated surface not only retains the high quality sheen and luster of the underlying finish, but surprisingly, the cured ultra thin coating provides the polished surface with a significantly improved resistance to abrasion, water staining and chemical/solvent attack.

The present invention also provides a novel water extendible free-radical curable polish formulation exhibiting excellent open-time and wipeability. The polish composition is formulated to have surface tension characteristics that allow it to be applied to form stable, ultra-thin films on widely variant surfaces, including traditional wood finishes. The applied films can be polymerized, for example by UV or electron beam radiation, to form a hard, non-tacky, high gloss, high clarity surface. Use of the present polish composition in the end processing step of furniture manufacturer helps to minimize marring of wood surfaces during shipment and thereby reduces costs of labor and materials for refinishing.

In one embodiment of the present invention the curable polish composition comprises an olefin functional polymer or an olefin functional pre-polymer and a silicone or silicone copolymer in a water extendible aqueous emulsion. The present UV curable polish compositions are formulated to include as well one or more photoinitiators, which ingredients are not required for (but can be present in) electron beam (EB) curable polish compositions in accordance with this invention. The present polish composition typically comprises about 90 to about 60% water, and the total polymer solids content of the polish composition ranges from about 10 to about 40% by weight with the ratio of olefin functional polymer or pre-polymer to silicone or silicone copolymer components ranging from about 2:1 to about 1:8 more preferably about 1:1 to about 1:6.

In one preferred embodiment the polish composition of the present invention includes an olefin functional polymer, preferably a polyacrylate, polyvinyl chloride, polycarbonate, polymethacrylate, a polyurethane or a copolymer thereof, a water dispersible silicone or silicone copolymer, a free-radical initiator, a water miscible organic solvent, a water immiscible organic solvent, water, and an emulsifier in an amount effective to stabilize the emulsion. In an alternative embodiment the olefin-functional (radical curable) component of the composition is a poly(olefin functional) monomer or oligomer, preferably in combination with a water dispersible, optionally olefin-functional, polymer.

The polish composition is applied by wetting the substrate surface to be treated in accordance with the invention with the polish composition and wiping the polish-wet surface, preferably with an absorbent pad to remove excess polish composition and provide a thin substantially uniform coating. Thereafter the wiped surface is exposed to free-radical initiating conditions to initiate free-radical propagated polymerization of the applied polish coating.

DETAILED DESCRIPTION OF THE INVENTION

One embodiment of the present invention is directed to a method for forming a thin, surface protective, polymerized polish coating or film on a surface. The polish coating is characterized as having a thickness of less than 0.5 mil (per application), and its capacity to improve mar resistance and chemical resistance of the polished surface. The polymerized polish films are applied in accordance with this invention by wetting the surface with a polish composition comprising a free-radical polymerizable polymer or prepolymer (monomer or oligomer), silicone or a silicone copolymer, and a free-radical initiator. The polish composition can be solvent-based or it can be water-based, i.e., as water extendible emulsion. The polish-wet surface is wiped to remove excess polish composition from the surface and to provide a substantially uniform coating on a surface, and thereafter, the coated surface is exposed to free-radical initiator dependent conditions, for example actinic radiation, to initiate free-radical propagated polymerization of the polish coating and provide a substantially uniform polymerized polish coating or generally having a thickness of about 0.1 to about 0.5 mil. Such polish coatings can be applied to a wide variety of substrate surfaces including wood finishes, metal surfices, plastic surfaces, textile, leather, and painted surfaces. Surprisingly the ultra thin polymerized polish films in accordance with this invention provide improved mar scratch resistance and as well resistance to penetration by water and other chemicals, for example, solvents and plasticizers.

In one embodiment the method of this invention is practiced with significant advantage in forming polymerized polish coatings on prefinished surfaces, particularly wood surfaces having nitrocellulose lacquer finishes. One or more applications of the free-radical polymerizable polish composition can be used as the final surface finishing step in furniture manufacture. The polish coating effectively reduces marring and scratching of the softer underlying lacquer finish during furniture shipment and storage. Moreover, on low sheen finishes the applied polish has been found to improve clarity and depth of image without significantly raising the gloss.

The lacquer finished surface is wetted with the polish composition containing a free-radical polymerizable polymer, monomer or oligomer, silicone or silicone copolymer and a free-radical initiator, preferably in aqueous emulsion. The polish can be applied by any number of art recognized techniques including spray application, roll coating, curtain coating, brushing, dipping or simply by delivering a portion of the polish composition to an area of the surface to be coated and spreading it manually with a pad or brush to wet the surface to be coated. The method of application is not critical. It is only important that the surface intended to receive the polish coating be wetted with the polish composition. The polish-wet surface is then wiped to remove excess polish front the substrate surface leaving a thin, uniform continuous polish coating on the surface.

The step of wiping the surface can be accomplished using the edge of a rubber blade (for example, a squeegee) or a pad, preferably an absorbent pad, for example a woven or nonwoven cloth, paper, or synthetic or natural sponge. In one embodiment the pad is water absorbent cloth or paper, and the surface is wiped until the surface is free of visibly discernible amounts of the polish composition. In other words, the surface is wiped until reflected light from the surface reveals a substantially continuous, uniform appearance, i.e., without streaks indicative of a nonuniform distribution of residual polish composition on the coated surface. The wiping step is effective to remove excess amounts of polish composition from the surface. When completed in accordance with a preferred embodiment of the present method, the wiped surface is essentially free of visibly discernible amounts of polish composition.

The polish composition is formulated to exhibit good wipeability and open time and to have surface tension characteristics that allow it to be applied to surface, as a surface adherent, ultrathin film, which is stable at least for a time sufficient to expose, the surface to free-radical initiator dependent conditions to initiate free-radical propagated polymerization of the free-radical polymerizable components of the applied polish film.

Formation of the polymerized polish coatings in accordance with this invention is completed by exposing the polish wetted, wiped surface to free-radical initiator-dependent conditions to initiate free-radical propagated polymerization of the free-radical reactive components of the polish coating or film on the surface. The nature of the conditions appropriate or necessary to complete polymerization of the applied polish composition is dependent on the nature of the free-radical initiator component of the polish composition.

In one preferred embodiment the polish composition is formulated to include a photoinitiator, more preferably a combination of photoinitiators, and the applied polish film is cured by exposing the surface to ultraviolet (UV) or electron beam (EB) radiation. In one embodiment the photoinitiator comprises benzophenone and at least one other organic photoinitiator. There are a wide variety of art-recognized commercially available photoinitiators detailed for use in UV curable coatings. One particularly suitable group of photoinitiators are those classified as alpha-hydroxyalkyl phenyl ketones, for example 1-hydroxycyclohexyl phenyl ketone (HCPK) or 2-hydroxy-2-methyl-l-phenyl-propane-l-one (HMMP). Numerous other photoinitiators of that class and related ketone and ketal compounds are well known in the art.

When the free-radical initiator component of the polish emulsion compositions used in accordance with the method of this invention comprises an organic photoinitiator, it is preferred to include as an additional component of the polish emulsion an effective amount of what is termed in the art as an amine synergist or a reactive amine co-initiator. Many such compounds are commercially available and detailed for use for enhancing radical propagated cure in photoinitiated polymerization of free-radical curable coating compositions. Thus, in one preferred embodiment of the invention wherein the method is carried out using a UV curable polish emulsion composition containing an organic photoinitiator, the polish composition further comprises an effective amount of a tri($C_2$–$C_4$) alkanolamine, for example, triethanolamine. Such compounds are known in the art to enhance the rate and effectiveness of photoinitiated cure of free-radical curable coating compositions, and such compounds are likewise effective to optimize the application and functionality of the polymerized polish coatings in accordance with this invention.

In one preferred embodiment of the invention UV radiation is used to cure polish film prepared by wiping an aqueous polish emulsion including benzophenone and either one or both of HCPK and HMPP. Photo induced polymerization of surface applied polish films in accordance with this invention can be accomplished with exposure times from about 1 second up to about 10 minutes depending on the nature of the photoinitiator, the power and nature of the radiation source, and the distance between the surface and the source of radiation. Some surfaces treated in accordance with this invention are heat sensitive, such as lacquer finished wood surfaces. UV cure protocols for polish coatings on such surfaces should be carried out in a manner to avoid thermally stressing the polished surface.

The curing of the applied polish film can also be accomplished by exposure to electron beam irradiation. When electron beam radiation is used to cure the applied polish coating in accordance with this invention, the photoinitiator component(s) of the composition can be significantly reduced or eliminated. Alternatively the polish composition used in accordance with the method of this invention can include free-radical initiators of the organic peroxide type. Such free-radical initiator compositions are well known in the art, and any of those commercially available can be incorporated into the polish emulsion composition prior to surface application. Thus in accordance with one embodiment of the invention a surface can be wetted with a polish composition including an organic peroxide free-radical initiator, wiped to remove excess polish composition and cured by heating, for example, by exposure of the surface to infrared radiation.

In one preferred embodiment of this invention the method is carried quit using a polish emulsion composition comprising a polyolefin functional polymer or prepolymer, for example a monomer or oligomer, a silicone or silicone copolymer, and benzophenone and at least one other organic photoinitiator. The surface is wetted with the polish the polish composition and immediately wiped with a soft absorbent paper or cloth pad to remove excess polish composition. Typically the surface is wiped to the extent that there are no visibly discernible excess amounts of the polish composition (wet-appearing streaks, for example) on the surface. The wiped surface can optionally be buffed before it is exposed to ultraviolet radiation. The surface is irradiated for a period of time sufficient to complete polymerization of the polymerizable components of the applied polish film. Again, the time required for radiation cure is dependent on numerous factors and can be optimized by routine experimentation. The conditions for polymerizing the polymer film should be selected and controlled dependent on the nature and properties of the substrate surface to which the polish composition has been applied. Thus, for example, nitrocellulose coated wood surfaces may be adversely affected with excessive heat, and it is important to carry out the polymerization of the applied coating under conditions which do not result in damage (for example blisters) in the underlying finish.

The polish composition in accordance with this invention is optimally formulated as an aqueous emulsion. The composition comprises an olefin functional polymer or an olefin functional prepolymer, for example an olefin functional monomer or an olefin functional oligomer, a water-dispersible silicone or silicone copolymer, a free-radical initiator, a water miscible organic solvent, a water immiscible organic solvent, water, and an emulsifier in an amount effective to stabilize the emulsion. In one embodiment the olefin functional polymer has a glass transition temperature of less than 30°. Optional additional ingredients, which can be employed to optimize the wipeability and application-dependent functionality of the polish composition, include additives selected from the group consisting of a wetting agent, a wax emulsion, a defoamer, fragrance, an air release agent, a rheology modifier, a biocide/fungicide, a fluorocarboxi an anti-static-change additive, a softness additive, a flow aid and a slip aid. Such optional ingredients are commercially available from many sources and well known to skilled practitioners in the coating arts. Thus, for example there are numerous commercial sources of emulsified waxes, for example paraffin, polyethylene, carnauba, teflon, and bees wax optionally having a melting point of about 20° to about 100° C. Rheology modifiers are additives for coating or polish formulations to modify viscosity and flow characteristics. They are usually functionalized polymers, wetting agents or surfactants that can exhibit their Theological modifying effects at low concentration, for example at less than 5% by weight, more typically at less than 2% by weight of the polish composition. Examples of functionalized polymers useful as rheology modifiers include, but are not limited to, Carbopol, Acrysol (Rohm & Haas) and Tafigel (King Industries). In the aqueous emulsion formulations of this invention, rheology modifiers can be added to increase the viscosity (thicken) the water medium to decrease the drying rate and improve workability and wipeability. The use of emulsified waxes, rheology modifiers, and other additives to effect modification of coating performance is well known in the art. Such optional additives can be used to modify functionality of the present polish emulsion composition and to fine tune polish properties to meet the unique functionality requirements of the widely variant applications of the present polymerizable polish compositions. Such can be accomplished without compromise of the improved scratch/mar resistance and chemical resistance produced by the thin polymerized polish coatings of this invention.

The polish composition of the present invention, itself formulated for use in accordance with the method of this invention, is preferably an aqueous emulsion including an olefin functional polymer having a glass transition temperature of less than 30° C. or an olefin functional prepolymer, for example a monomer or oligomer, and a water dispersible silicone or silicone copolymer. The polish emulsion is also formulated to include a water miscible organic solvent, a water immiscible organic solvent, water and an emulsifier of an amount effective to stabilize the emulsion. UV curable polish compositions in accordance with this invention are formulated to include, as well, free-radical initiator component(s). That component is optional in polish compositions of this invention formulated for cure by electron beam radiation. Typically in the UV curable polish emulsion compositions preferred in accordance with this invention comprise about 0.1 to about 5%, more preferably about 0.15 to about 3%, by weight of free-radical initiator. Preferably the free-radical initiator component of the present polish emulsion compositions comprise two or more free-radical initiator species. In one embodiment benzophenone is used in combination with one or more alpha-hydroxy alkyl phenyl ketones.

While the water dispersible silicone or silicone copolymer can be selected to have olefin functionality (and thus can be free-radical curable), the principal source of olefin functionality of the polish composition is an olefin functional polymer having a glass transition temperature of less than 30° C. or an olefin functional prepolymer, such as an olefin functional monomer or an olefin functional oligomer. Preferably the olefin functional polymer or olefin functional prepolymer is selected to have polyolefin functionality in the form of terminal or pendant ethylenic olefin groups, for example those derived from acrylate or methacrylate esters or vinyl or allyl ester or ether functioned groups. Preferably the olefin functional polymer or prepolymer has two or more such pendent groups per molecule. There is a wide variety of such poly(olefin functional) polymers and prepolymers that are commercially available. Suitable poly(olefin functional) polymers include those wherein the polymer is selected from the group consisting of polyester, polyurethane, polyether, epoxy, polyamide, polyacrylate, polymethacrylate and copolymers thereof The polymers can have a weight average molecular weight of about 20,000 to about 350,000, optionally about 25,000 to about 300,000. In one embodiment the poly(olefin functional) polymer is an acrylic polymer having a weight average molecular weight in excess of 100,000 and a glass transition temperature of less than 20° C. In another embodiment the poly(olefin functional) polymer component of the polish composition is an acrylic polymer having a molecular weight greater than 200,000, two or more pendant acrylate or methacrylate ester groups, and a glass transition temperature of less than 10° C. Other polymer compositions having two or more olefin functional groups, preferably acrylate or methacrylate groups are suitable for use in formulating the present polish compositions. In one embodiment of this invention the poly(olefin functional) polymer is a polyacrylate or polymethacrylate functionalized polyurethane, polyacrylate or polymethacrylate. Exemplary of olefin functional polymers for use in this invention are Ebecryl 2905, an acrylated urethane (UBC); Ebecryl 8800, a urethane acrylate (Radcure Specialties); Bayhydrol 850W, an unsaturated polyester (Bayer); Ebercryl 830, a polyester acrylate (UBC); and Sancure 850, a UV curable urethane (BF Goodrich Specialty Chemicals) and like UV curable polymer compositions.

Olefin functional prepolymers, including both monomers and oligomers, can also be used as a free-radical polymerizable component of the present polish compositions. Preferred olefin functional prepolymers include monomers or oligomers having two or more pendant ethylenically unsaturated groups derived from acrylate or methacrylate esters or vinyl or allyl esters or ethers. Examples of suitable olefin functional prepolymers for use in the present polish compositions include 1,4-butylene diacrylate or dimethacrylate, ethylene glycol diacrylate and dimethacrylate, hexanediol diacrylate or dimethacrylate, glycerol diacrylate or dimethacrylate, glycerol triacrylate or trimethacrylate, pentaerythritol triacrylate or trimethacrylate, trimethyolpropanetriacrylate, diallyl phthalate, dipentaerythritol pentaacrylate, neopentyl glycol diacrylate and oligomer polyacrylates and polymethacrylates such as the polyester hexacrylate sold under the trade name Ebecryl 830 sold by Radcure Chemical Corporation. Another suitable oligomer is Santolink X1100, an allylic unsaturated aliphatic oligomer sold by Monsanto.

The olefin functional prepolymers are preferably used in combination with one or more water dispersible polymers, optionally olefin functional, wherein the polymer is selected from a polyester, polyurethane, polyether, polyamine, polystyrene, polycarbonate, polyacrylate, epoxy, polyvinyl acetate, polyvinyl chloride, polymethacrylate or a copolymer thereof. The presence of such "host polymers" in polish composition formulated using poly(olefin functional) prepolymers helps to control shrinkage and add flexibility to the cured polish films. When a host polymer is used in combination with a poly(olefin functional) prepolymer in polish compositions of this invention the weight ratio of prepolymer to host polymer is about 1:4 to about 4:1.

The other polymer component of the polish emulsion in accordance with this invention is a silicone or silicone copolymer. In one embodiment of this invention, the silicone or silicone copolymer ingredient is dimethylpolysiloxane or a copolymer of dimethylpolysiloxane, optionally having olefin, hydroxy, carboxy or amine functionality. The silicone or silicone copolymer is typically added during formulation of the present polish composition, as a preformed emulsion. There is a wide variety of commercially available silicone or silicone copolymer emulsions suitable for use in preparation of the present polish compositions. In one embodiment, the silicone ingredient is provided as an aqueous emulsion of a dimethylpolysiloxane oil having a neat viscosity of about 50 to about 20,000 centistokes. In another embodiment of the present invention the silicone or silicone copolymer comprises an olefin-functional silicone or silicone copolymer, for example, an acrylated polydimethylsiloxane or polydimethylsiloxane copolymer. Exemplary of suitable silicone or silicone copolymer ingredients for use in formulating the present polish compositions are: AP-02-80, silicone copolymer emulsion (Advanced Polymer); BYK-371, acrylic functional polyester modified dimethylpolysiloxane; Ebecryl 350, silicone ester acrylate oligomer (Radcure/UBC); and Daimul 60, polysiloxane emulsion (Advanced Polymer, Inc.).

Other than the polish compositions of this invention targeted for use in electron beam initiated curing protocols, the polish compositions of this invention include one or more free-radical initiator. In a perfect embodiment if the invention the free-radical initiators component comprises a photoinitiator to produce UV-curable polish compositions. Typically the photoinitiator comprises benzophenone and at least one other organic photoinitiator, for example, an alpha-hydroxyalkyl phenyl ketone and related ketone and ketal compounds. Good results have been obtained in UV curable coatings when the photoinitiator component includes benzophenone and at least one other commercially available photoinitiator of the alpha-hydroxyallyl phenyl ketone type, for example, 1-hydroxycyclohexyl phenyl ketone (ACPK) and 2-hydroxy-2-methyl-1-phenyl-1-propane-1-one (HMPP). Other free-radical initiators, for example, thermally labile organic peroxides known by those skilled in the art to be useful in free-radical curable polymer coating compositions may also be used in formulating the present polish compositions; however, such formulations typically have less open time and shelf life and are optimally formulated immediately prior to use in accordance with the present method. Polish films applied in accordance with the present invention using such organic peroxide containing polish compositions are cured by heating the surface-applied polish composition, for example, by exposure of the polish film bearing surface to infrared radiation.

The preferred polish emulsion compositions in accordance with this invention also include both a water miscible organic solvent and a water immiscible organic solvent, water, and emulsifiers in an amount effective to stabilize the emulsions. The emulsifier can be added as an independent ingredient and/or as a component of the preformed olefin-functional polymer or silicone emulsion ingredients. The nature of the emulsion-stabilizing emulsifier is not critical and any emulsion compatible surfactant composition can be employed, including cationic, anionic and nonionic surfactants.

Water miscible organic solvents useful in formulating the present composition include $C_2$–$C_4$ alcohols, $C_2$–$C_4$ alkylene glycols, poly($C_2$–$C_4$)allylene glycols, $C_1$–$C_4$ allyl ethers of such compounds, $C_2$–$C_4$ alkanoic acid esters thereof and other water miscible solvents recognized by those skilled in the art, generally useful, for example as coalescing agents in latex coating compositions. Exemplary of such compositions are ethanol, propanol, 2-propanol, butanol, ethylene glycol, propylene glycol, butylene glycol, polyethylene glycol, polypropylene glycol, and lower alkyl ethers thereof such as 2-butoxy ethanol, 2-butoxy propanol, 2-methoxy ethanol, ethylene glycol monomethyl ether acetate, and the like.

The water immiscible organic solvent component of the preferred polish emulsion composition is selected from the group consisting of kerosene, naphtha, petroleum ether mineral spirits, mineral oil and like water immiscible petroleum-based solvents commonly utilized in the preparation of non-aqueous coating formulations. In one embodiment of the present polish emulsion compositions the water immiscible water organic solvent component comprises at least two water immiscible organic solvents.

The ingredient stoichiometry used in formulating the present polish compositions can be varied widely in adjustment of polish functionality to meet the functional requirements of each targeted application. Typically for each 100 parts by weight polish composition, the aqueous emulsion includes about 2 to about 20 parts by weight of an olefin-functional polymer or prepolymer, about 0.1 to about 3 parts per weight of a photoinitiator, about 5 to about 35 parts per weight of a silicone polymer or copolymer, about 0.5 to about 1 part per weight of a wetting agent with the remainder of the formulation being water, water miscible organic solvent, and water immiscible organic solvent along with any added optional ingredients, for example, wetting agents, emulsified waxes, defoamers, fragrance, air release agents, leveling agents, rheology modifiers, biocides/fungicides, fluorocarbons, anti-static-charge additives, softness additives, flow aids and slip aids. Generally the olefin-functional polymer or prepolymer and silicone or silicone copolymer components of the present composition comprise about 10 to about 40 weight percent of the polish composition. The weight ratio of poly(olefin-functional) polymer or copolymer to silicone or silicone copolymer is typically about 2:1 to about 1:8. At higher solids content, for example at about 18 to about 45% by weight solids, addition of a rheology modifier is particularly useful to improve the flow characteristics and wipeability of the polish composition. Rheology modifiers typically comprise about 0.1 to about 5% by weight, more typically about 0.5 to about 2% by weight of the polish composition.

In one embodiment of the invention each 100 parts by weight of the polish composition includes about 30 to about 60 percent by weight water, about 15 to about 35 percent, more preferably about 20 to about 30 percent by weight of a water miscible, organic solvent, and about 2 to about 15 percent, more preferably about 4 to about 12 percent by weight of a water immiscible organic solvent. Generally the weight ratio of water miscible solvent to water is about 1:6 to about 4:1 and the weight ratio of water miscible solvent to water immiscible solvent is in the range of 8:1 to about 1:2. Again, ingredient stoichiometry can be varied to optimize polish composition functionality for each targeted curable polish application.

The polish emulsion compositions of this invention are prepared using standard equipment typically utilized by those skilled in the art in the manufacture of coating formulations. Generally the present polish emulsion compositions are prepared using a standard emulsify-mix-let down processing protocol. In one embodiment a free-radical curable polish emulsion composition (100 parts per weight) is prepared in a vessel including a mechanical agitator. The formulation is prepared by first selecting or forming an aqueous emulsion of about 2 to about 20 parts by weight of an olefin-functional polymer or prepolymer. To that emulsion is added with agitation about 0.01 to about 0.5 parts by weight of an active amine coinitiator or amine synergist and a solution of about 0.1 to about 5 parts by weight of a free-radical initiator in a water miscible organic solvent. Further, about 5 to about 35 parts per weight of a silicone polymer or copolymer is added with agitation. The silicone or silicone copolymer ingredient is preferably added as a preformed aqueous emulsion in two parts, one part during the emulsify/mixing phase and a second major part during the let down phase. To the agitated formulation is also added about 0.5 to about 1 part by weight of a wetting agent and about 2 to about 10 parts by weight of water immiscible organic solvent; those ingredients are typically added as a preformed aqueous emulsion, preferably in two portions, the second major portion being added during the let down phase. Additional emulsifier is added, if necessary to stabilize the emulsified ingredient mixture. Finally, as part of the let down phase, additional water miscible solvent, water and water immiscible solvent, is added, to adjust the water content of the emulsion to about 30 to about 60 parts by weight, to adjust the weight ratio of water to water miscible solvent in the range of about 6:1 to about 1:4, and to adjust the weight ratio of water miscible solvent to water immiscible solvent in the range of about 8:1 to about 1:2. Optional additional ingredients selected from the group consisting of emulsified wax, defoamers, fragrance, air release agents, leveling agents, rheology modifiers, fluorocarbons, anti-static-charge additives, biocides/fungicides, softness additives, flow aids and slip aids are added, if desirable, typically in the emulsification and mixing steps prior to the let down phase of emulsion preparation.

The polish compositions of this invention can be applied in accordance with the method embodiment of this invention to provide thin surface protective polymerized polish coatings on a wide variety of substrate surfaces. The polish composition is applied in an amount sufficient to uniformly wet the surface to receive the polish coating, and thereafter the surface is wiped free of visibly discernible excess amounts of the polish composition, optionally buffed by hand or using powered buffing equipment, and thereafter exposed to free-radical initiator dependent conditions to polymerize the olefin-functional components of the applied polish coating. In a preferred embodiment of the invention the free-radical initiator component is a photoinitiator or mixture thereof, and the polish coating is cured using a source of UV radiation. Such processing has provided particularly favorable results in providing mar resistant, chemical resistant polymerized polish coatings on nitrocellulose lacquer coated wood furniture surfaces.

The following non-limiting examples are provided to illustrate polish compositions of the present invention. The ingredients listed in each Examples 1–4 are blended in a laboratory mixer to produce a stable emulsion using a standard emulsification-mixing-let down protocol. The emulsion is thereafter blended with photoinitiator solution typically containing benzophenone and at least one alpha-hydroxyalkyl phenyl ketone in a water miscible solvent in a ratio of about 100 parts emulsion to about 1 to about 5 parts photoinitiator solution. The polish compositions, of Examples 5–8 were prepared generally in accordance with the procedure outlined above in this specification.

EXAMPLE 1

| | Weight Percent |
|---|---|
| Mineral spirits | 7.36 |
| Deionized water | 14.72 |
| Tween 40 (surfactant; ICI) | 0.44 |
| Span 20 (surfactant; ICI) | 0.44 |
| Triton GR7M (wetting agent) | 0.44 |
| Lemon oil | 0.29 |
| Trimethylolpropanetriacrylate (TMPTA) | 11.04 |
| Ebecryl 1360 (polyester acrylate; Radcure) | 8.10 |
| KF28 Gel (aminopolysiloxane copolymer; Advance Polymer) | 7.36 |
| Tego Glad 46 | 4.12 |
| BYK-346 | 2.94 |
| Propylene glycol | 14.72 |
| Deionized water | 8.83 |
| Uraflex XP 405 UV (polyurethane acrylate; DSM Resins) | 11.78 |
| APG 1350 (Advance Polymer) | 7.36 |

EXAMPLE 2

| | Weight Percent |
|---|---|
| Mineral spirit | 3.92 |
| Deionized water | 7.84 |
| Tween 40 | 0.23 |
| Span 20 | 0.23 |
| Lemon oil | 0.12 |

-continued

| | Weight Percent |
|---|---|
| TMPTA | 5.89 |
| EBECRYL 1360 (acrylated silicone oligomer; UCB/Radcure) | 5.89 |
| KF 28 Gel(aminopolysiloxane copolymer; Advanced Polymer, Inc.) | 7.05 |
| Tego Glad 46 | 1.56 |
| BYK-346 | 0.94 |
| Deionized water | 4.70 |
| Propylene glycol | 7.84 |
| Uraflex ZB 2773 (UV curable urethane; DSM) | 10.19 |
| Tego Rad 2600 | 6.98 |
| Deionized water | 22.51 |
| Mineral oil emulsion | 14.04 |

EXAMPLE 3

| | Weight Percent |
|---|---|
| Kerosene | 8.64 |
| Deionized water | 13.44 |
| Triton GR 7M | 0.54 |
| Span 20 | 0.54 |
| Tween 40 | 0.54 |
| Lily of the valley (fragrance) | 0.27 |
| TMPTA | 10.75 |
| EBECRYL 1360 (acrylated silicone oligomer; UCB/Radcure) | 10.75 |
| Tego Glad 46 | 2.69 |
| KF28 Gel (Advance Polymer, Inc.) | 12.09 |
| Deionized water | 8.06 |
| Propylene glycol | 13.44 |
| Uraflex ZB 2773 (UV curable urethane; DSM) | 18.81 |

EXAMPLE 4

| | Weight Percent |
|---|---|
| Mineral Spirits | 6.95 |
| Deionized water | 13.90 |
| Tween 40 | 0.41 |
| Span 20 | 0.41 |
| Lemon oil | 0.20 |
| TMPTA | 10.43 |
| EBECRYL 1360 Radcure | 10.43 |
| KF 28 Gel (Advance Polymer Inc.) | 12.51 |
| Tego Glad 46 | 2.78 |
| BYK 346 | 1.67 |
| Deionized water | 8.34 |
| Propylene glycol | 13.90 |
| Uraflex ZB 2773 | 18.07 |

EXAMPLE 5

| | Weight Percent |
|---|---|
| Kerosene | 4.43 |
| Mineral Oil | 1.77 |
| Deionized water | 23.60 |
| Roshield 3120 (olefin-functional acrylic emulsion; Rohm & Haas) | 10.00 |
| Triethanolamine | 0.12 |
| Propylene glycol | 25.20 |
| Benzophenone | 0.17 |
| HMPP (Daracure 1173; Ciba) | 0.06 |

-continued

| | Weight Percent |
|---|---|
| HCPK (Irgacure 184; Ciba) | 0.10 |
| SM2164 (polydimethylsiloxane emulsion - GE) | 33.70 |
| Triton GR-7M (wetting agent) | .16 |
| Naphtha | .89 |

EXAMPLE 6

| | Weight Percent |
|---|---|
| Roshield 3120 resin (Rohm & Haas) | 35.00 |
| Sancur 843 resin (BF Goodrich) | 10.00 |
| Deionized water | 10.00 |
| Benzophenone | 0.53 |
| Irgacure 184 (Ciba Geigy) | 0.80 |
| Daracure 1173 (Ciba Geigy) | 0.53 |
| Propylene glycol | 2.14 |
| Silicon additive, SM 2164 (General Electric) | 40.00 |
| Carbopol EZ-2 (BF Goodrich) | 1.00 |

EXAMPLE 7

| Ingredient | Parts |
|---|---|
| Roshield E-3120 | 10.00 |
| Deionized water | 22.20 |
| Amine | 0.10 |
| Irgacure 184 | 0.10 |
| Daracure 1173 | 0.15 |
| Propylene glycol | 25.00 |
| Benzophenone | 0.07 |
| Silicone SM2164 | 34.00 |
| Naphtha | 1.00 |
| Kerosene | 4.50 |
| Mineral Oil | 1.84 |
| Fragrance | 0.10 |
| Triton GR7M | 1.00 |

EXAMPLE 8

| | Weight Percent |
|---|---|
| Acrylic latex E-3120 | 35.00 |
| Polyurethane | 10.00 |
| Deionized water | 11.00 |
| Silicone GE SM2164 | 40.00 |
| Irgacure | 0.80 |
| Daracure 1173 | 1.33 |
| Benzophenone | 0.54 |
| Propylene glycol | 1.33 |

Physical and Chemical Test Results

The polish compositions in accordance with this invention were applied to nitrocellulose finished wood surfaces and UV irradiated, and the physical and chemical properties of the resulting polished surfaces were evaluated. Each polish composition was applied in an amount sufficient to wet the nitrocellulose finished surface. The surface was then wiped free of visibly discernible amounts of the polish composition with an absorbent pad and exposed to UV radiation (360–400 Angstrom mercury vapor lamp or 360–400 Angstrom gallium lamp at 860 milli joules/cm$^2$ for about 6 seconds) to polymerize the olefin and functional components of the applied polished composition.

Each of the polished surfaces were evaluated for mar resistance, impact resistance, adhesion resistance, abrasion resistance, scratch resistance, cold check resistance, slip, and gloss. Table 1 lists the results of those tests. The surface polished with the composition of Example 6, the high solids content composition, exhibited the best results in the physical property testing.

The polished surfaces were also evaluated for their chemical tolerance to various solvents, including Vodka, Ethanol, Isopropyl alcohol, Windex, dibutyl phthalate, acetone, methyl ethyl ketone, methyl ethyl ketone rub, and hot water. The solvents were applied to the polished surface and after a predetermined period of time, the solvent was blotted with an absorbent cloth and dried. Each surface was then visually inspected and scored on a scale of 1 to 10 (10 being the best and 1 being the worst), based on the retention of gloss and surface clarity. Table 2 lists the chemical test results.

wiping the wet surface to remove excess emulsion from the surface and provide a substantially uniform coating on the surface, and exposing the coated surface to free-radical initiating conditions to initiate free-radical propagated polymerization of the coating.

2. The method of claim 1 wherein the wiping step comprises the step of wiping the wet surface using an absorbent pad.

3. The method of claim 1 wherein the free-radical initiator is a photoinitiator and the wiped, coated surface is exposed to ultraviolet radiation.

4. The method of claim 1 wherein after polymerizing the coating, the polymerized coated surface is wetted with the emulsion composition, wiped and again exposed to free-radical initiating conditions.

TABLE 1

Physical Test Results

| ESA# | Coating | Mar Resistance[1] | Impact Resistance[2] | Adhesion Resistance[3] | Abrasion Resistance[4] | Scratch Resistance[5] | Cold Check Resistance | Slip cm/sec[6] | Gloss |
|---|---|---|---|---|---|---|---|---|---|
| 10619 | NC | 3 | 10 | 7 | 3 | 1 | 1 | 1 | 86.5 |
| 10620 | NC + Example 8 | 10 | 10 | 10 | 4 | 7 | 2 | 8 | 86.5 |
| 10621 | NC + Marguard[A] | 7 | 10 | 10 | 3 | 1 | 1 | 7 | 86.5 |
| 10624 | NC + Example 7 | 7 | 9 | 10 | 8 | 6 | 4 | 9 | 86.7 |
| 10625 | NC + Example 6 | 10 | 10 | 10 | 9 | 10 | 10 | 10 | 88.6 |

[A]Commercial formulation
[1]ASTM D5178-98
[2]Gardner Impact Tester, with 2, 4, 6, 10 and 20 lbs
[3]ASTM D5178-91
[4]Teledyne Taber Tester using 500 g and a CS-5 Wheel
[5]Hoffmann-Scratch-Hardness Tester SG-1610 using 2, 3, 4, and 8 lbs.
[6]Water slide method using 0.4 g deionized water inclined at 10° slope

TABLE 2

Chemical Test Results

| ESA# | Coating | Vodka | Ethanol | Isopropyl alcohol | Windex | Dibutyl Phthalate | Acetone | Methyl ethyl ketone | Methyl ethyl ketone Rub | H$_2$O (Hot) |
|---|---|---|---|---|---|---|---|---|---|---|
| 10619 | NC | 10 | 10 | 6 | 6 | 1 | 1 | 1 | 1 | 9 |
| 10620 | NC + Example 8 | 10 | 10 | 8 | 10 | 9 | 8 | 8 | 8 | 10 |
| 10621 | NC + Marguard[A] | 10 | 10 | 9 | 10 | 4 | 1 | 1 | 1 | 10 |
| 10624 | NC + Example 7 | 10 | 10 | 8 | 10 | 8 | 7 | 8 | 8 | 10 |
| 10625 | NC + Example 6 | 10 | 10 | 9 | 9 | 9 | 8 | 8 | 8 | 10 |

[A]Commercial formulation

I claim:

1. Method for improving mar resistance and chemical resistance of a nitrocellulose lacquer finish on a wood surface, said method comprising the steps of wetting the lacquer finished surface with an aqueous emulsion, said emulsion having a total solids content of about 18% to about 45% by weight and comprising, an olefin functional polymer or an olefin functional prepolymer, a water-dispersible silicone or silicone copolymer, a free-radical initiator, a rheology modifier a water miscible organic solvent, water, and an emulsifier in an amount effective to stabilize the emulsion, 5. The method for forming a thin surface protective coating on a surface, said method comprising the step of wetting the surface with a polish composition having a total solids content of about 18 to about 45% by weight and comprising an olefin-functional polymer or an olefin-functional prepolymer, silicone or a silicone copolymer, a free-radical initiator, and about 0.5 to about 5% of a rheology modifier, wiping the polish-wet surface to remove excess polish composition from the surface and to provide a substantially uniform coating on the surface, and exposing the coated surface to free-radical initiator-dependent conditions to initiate free-radical propagated polymerization of the polish coating to provide a polymerized polish coating having a thickness of less than 0.5 mil.

6. The method of claim 5 wherein the polish composition comprises a poly(olefin) functional polymer selected from polyester, polyurethane, polyether, polyamide, epoxy, polyacrylate, polymethacrylate, polystyrene, polyvinyl chloride, polycarbonate or copolymers thereof.

7. The method of claim 6 wherein the polish composition is an aqueous emulsion and the poly(olefin functional) polymer has a glass transition temperature of less than 30° C.

8. The method of claim 5 wherein the free-radical initiator in the polish composition comprises benzophenone and at least one other organic photoinitiator.

9. The method of claim 8 wherein the polish composition further comprises an amine synergist.

10. The method of claim 5 wherein the wiping step comprises the step of wiping the polish-wet surface with an absorbent pad.

11. Method for improving mar resistance and chemical resistance of a nitrocellulose lacquer finish on a wood surface, said method comprising the steps of wetting the lacquer finished surface with an electron beam curable polish composition having a total solids content of about 18 to about 45% by weight, and comprising, as an aqueous emulsion, an olefin functional polymer or an olefin functional prepolymer, a water-dispersible silicone or silicone copolymer, a rheology modifier, a water miscible organic solvent, a water immiscible organic solvent, water, and an emulsifier in an amount effective to stabilize the emulsion, wiping the polish-wet surface to remove excess polish composition from the surface and provide a substantially uniform polish coating on the surface, and exposing the coated surface to electron beam radiation to initiate free-radical propagated polymerization of the polish coating.

12. A composition for modifying the physical and chemical characteristics of a surface, said composition comprising an aqueous emulsion having a total solids content of about 18% to about 45% and comprising a free radical initiator, a rheology modifier, and polymer solids, said polymer solids including at least one olefin-functional polymer and a water dispersible silicone or silicone copolymer and wherein the weight ratio of olefin functional polymer to silicone/silicone copolymer is about 2:1 to about 1:8.

13. The composition of claim 12 wherein the rheology modifier is about 0.1 to about 5% by weight of the composition.

14. A method for improving chemical resistance of a textile, said method comprising the steps of wetting the surface of the textile with an aqueous emulsion comprising, an olefin functional polymer or an olefin functional prepolymer, a water-dispersible silicone or silicone copolymer, a free-radical initiator, a water miscible organic solvent, a water immiscible organic solvent, water, and an emulsifier in an amount effective to stabilize the emulsion, removing excess emulsion from the textile surface, and exposing the emulsion coated surface to free-radical initiator dependent conditions to initiate free-radical propagated polymerization of the coating.

15. The method of claim 14 wherein the free-radical initiator is a photoinitiator and the emulsion-coated surface is exposed to ultraviolet radiation.

16. The method of claim 15 wherein the free-radical initiator includes benzophenone and at least one other organic photoinitiator, and the coated surface is exposed to ultraviolet radiation to polymerize the emulsion coating.

17. The method of claim 15 wherein the aqueous emulsion has a total solids content of about 18 to about 45% by weight.

18. The method of claim 14 wherein after polymerizing the coating, the polymerized coated surface is wetted with the aqueous emulsion, the excess emulsion is removed from the textile surface, and the emulsion-coated surface is again exposed to free-radical initiating conditions.

* * * * *